United States Patent
Barkley et al.

(10) Patent No.: US 6,389,493 B1
(45) Date of Patent: May 14, 2002

(54) SYSTEM AND METHOD FOR DYNAMICALLY ALLOCATING BANDWIDTH TO A PLURALITY OF SLAVE CARDS COUPLED TO A BUS

(75) Inventors: Mohan Jonathan Barkley; Andrew Morton Spooner, both of Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/343,116

(22) Filed: Jun. 29, 1999

(51) Int. Cl.⁷ .............................................. G06F 13/00
(52) U.S. Cl. ...................................... 710/110; 710/117
(58) Field of Search ........................... 710/41, 110, 116, 710/117; 370/257, 345, 395.41, 231, 254

(56) References Cited

U.S. PATENT DOCUMENTS

| | | | |
|---|---|---|---|
| 5,224,099 A | 6/1993 | Corbalis et al. | 370/94.2 |
| 5,313,454 A | 5/1994 | Bustini et al. | 370/13 |
| 5,359,592 A | 10/1994 | Corbalis et al. | 370/17 |
| 5,479,407 A * | 12/1995 | Ko et al. | 370/231 |
| 5,479,447 A | 12/1995 | Chow et al. | 375/260 |
| 5,793,978 A | 8/1998 | Fowler | |
| 5,796,729 A * | 8/1998 | Greaney et al. | 370/345 |
| 6,098,123 A * | 8/2000 | Olnowich | 370/254 |

FOREIGN PATENT DOCUMENTS

EP  0677941 A2  2/1995

* cited by examiner

Primary Examiner—Glenn A. Auve
(74) Attorney, Agent, or Firm—Baker Botts L.L.P.

(57) ABSTRACT

A bus management system for dynamically allocating bandwidth comprises a bus and a plurality of slave cards coupled to the bus. The slave cards communicate data to the bus and receive data from the bus. The system also includes a master card coupled to the bus. The master card communicates data to the bus and receives data from the bus. The master card comprises a memory, a communication module, and a control module. The memory stores bandwidth information indicating bandwidths allocated to the slave cards. The communication module, coupled to the bus and the memory, communicates with the slave cards according to the bandwidths indicated by the bandwidth information The control module, coupled to the memory, allocates a new bandwidth to a selected slave card and modifies the bandwidth information to indicate the new bandwidth allocated to the selected slave card.

30 Claims, 3 Drawing Sheets

| TIME | BUS BANDWIDTH | | | QUEUES AT MASTER CARD | | |
|---|---|---|---|---|---|---|
| | A | B | C | A | B | C |
| 0 | 10 | 10 | 10 | 0 | 0 | 0 |
| 1 | 10 | 10 | 10 | 4 | 4 | 4 |
| 2 | 15 | 10 | 10 | 4 | 4 | 4 |
| 3 | 15 | 10 | 10 | 4 | 7 | 4 |
| 4 | 15 | 15 | 10 | 4 | 7 | 4 |
| 5 | 15 | 15 | 10 | 4 | 4 | 4 |
| 6 | 15 | 10 | 10 | 4 | 4 | 4 |
| 7 | 5 | 5 | 30 | 4 | 4 | 4 |
| 8 | 10 | 10 | 20 | 4 | 4 | 4 |
| 9 | 10 | 15 | 15 | 4 | 4 | 4 |

SYSTEM AND METHOD FOR DYNAMICALLY ALLOCATING BANDWIDTH TO A PLURALITY OF SLAVE CARDS COUPLED TO A BUS

TECHNICAL FIELD OF THE INVENTION

This invention relates generally to bus management systems and, more specifically, to a system and method for dynamically allocating bandwidth to a plurality of slave cards coupled to a bus.

BACKGROUND OF THE INVENTION

Many communication and processing systems include one or more cards coupled to a backplane. The backplane typically has a bus that supports communication between the various cards. Because only a single card may communicate over the bus at a time, these communication and processing systems rely on various types of protocols to govern communication over the bus. According to one such protocol, a single card, called a master card, may communicate over the bus with any other card at any time, and the other cards, known as slave cards, may communicate over the bus only when permitted by the master card. Because the slave cards cannot initiate communication over the bus but can only respond to communication from the master card, the master card must periodically poll the slave cards for service by communicating a poll message to each slave card. When a slave card receives a poll message, the slave card may acknowledge receipt of the poll message or respond with a request for service. This master-slave protocol prevents more than one card from utilizing the bus at the same time.

In communication and processing systems, the master card generally allocates a fixed amount of bus bandwidth to each slave card and, thus, polls each slave card at a fixed rate. Unfortunately, a fixed distribution of bus bandwidth does not accommodate the different needs of different types of slave cards and does not adjust as the needs of a slave card change over time. This inefficient distribution of bus bandwidth degrades the performance of communication and processing systems and can cause messages to pile-up at queues associated with the slave cards or the master card. This message pile-up results in inefficient use of memory and may result in loss of messages if a queue is fill. For these reasons, master-slave protocols have had deleterious effects on communication and processing systems.

SUMMARY OF THE INVENTION

In accordance with the present invention, a system and method for dynamically allocating bandwidth to a plurality of slave cards is provided that substantially eliminates or reduces disadvantages or problems associated with previously developed systems and methods.

In one embodiment, a bus management system dynamically allocates bandwidth. The system includes a bus and a plurality of slave cards coupled to the bus. The slave cards communicate data to the bus and receive data from the bus. The system also includes a master card coupled to the bus. The master card also communicates data to the bus and receives data from the bus. The master card comprises a memory, a communication module, and a control module. The memory stores bandwidth information indicating bandwidths allocated to the slave cards. The communication module, coupled to the bus and the memory, communicates with the slave cards according to the bandwidths indicated by the bandwidth information. The control module, coupled to the memory, allocates a new bandwidth to a selected slave card and modifies the bandwidth information to indicate the new bandwidth allocated to the selected slave card.

In another embodiment, a slave card communicates with a master card over a bus according to a dynamically allocated bandwidth. The slave card comprises a communication module and a control module. The communication module, coupled to the bus, communicates data to the bus and receives data from the bus according to a first bandwidth allocated to the slave card by the master card. The control module, coupled to the communication module, communicates a bandwidth message requesting the master card to change the first bandwidth allocated to the slave card. The communication module communicates data to the bus and receives data from the bus according to a second bandwidth allocated to the slave card by the master card.

Technical advantages of the present invention include a system and method for dynamically allocating bandwidth to a plurality of slave cards coupled to a bus. According to the present invention, a master card can dynamically allocate bus bandwidth to a plurality of slave cards and communicate with the slave cards according to the dynamically allocated bus bandwidth. As a result, the distribution of bus bandwidth accommodates the different needs of different types of slave cards and adjusts as the needs of a slave card change over time. This dynamic allocation of bus bandwidth results in more efficient use of the bus bandwidth, improved performance of the slave cards, and less message pile-up in queues associated with the master card and slave cards. For example, a slave card executing a bandwidth-intensive application, such as a software download, may exploit the bus bandwidth not being utilized by other slave cards. In addition, a slave card executing a processing-intensive application may receive less bandwidth to avoid the interruptions caused by the master card's constant polling for service. For these and other readily apparent reasons, the present invention represents a significant advance over prior art systems and methods.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
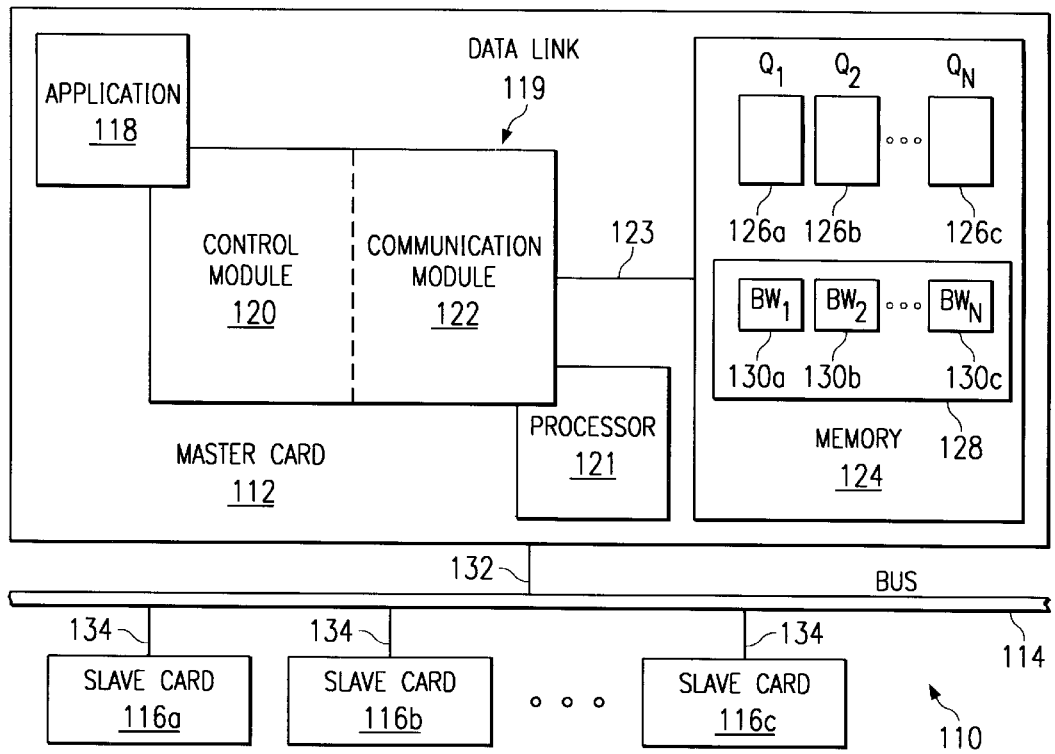
FIG. 1 illustrates a system for dynamically allocating bus bandwidth to a plurality of slave cards.

FIG. 1 illustrates a system 110 for dynamically allocating bus bandwidth to a plurality of slave cards 116a, 116b, and 116c (collectively, slave cards 116) coupled to a bus 114. A master card 112 dynamically allocates a bus bandwidth to each slave card 116 and communicates with each slave card 116 over bus 114 according to the allocated bandwidth. The present invention contemplates various systems and methods for dynamically allocating bus bandwidths to slave cards 116. As explained in further detail below, several methods of dynamically allocating bus bandwidth may be initiated by master card 112, and other methods of dynamically allocating bus bandwidth may be initiated by slave cards 116.

System 110 may be implemented in a variety of communication or processing contexts. In a particular embodiment, system 110 may comprise a digital subscriber link access multiplexer (DSLAM) used to support digital subscriber lines (DSL). Although asymmetric DSL (ADSL) technology is discussed, system 110 may support integrated DSL (IDSL), symmetric DSL (SDSL), high-data-rate DSL (HDSL), rate-adaptive DSL (RADSL), very-high-data-rate DSL (VDSL) or any other suitable DSL technology. Within this particular embodiment, master card 112 is a system controller card, slave card 116a is line interface module (LIM), slave card 116b is an ADSL transmission unit-central (ATU-C), and slave card 116c is a network interface card (NIC). In operation, LIM 116a receives a transmission from a twisted-pair telephone line, splits the transmission into an analog telephone signal and a digital data signal, communicates the telephone signal to a public switched telephone network, and communicates the data signal to ATU-C 116b. ATU-C 116b receives the data signal and communicates data corresponding to the signal to NIC 116c. NIC 116c receives the data from ATU-C 116b and communicates the data to a data network, such as the Internet. Such an embodiment may also include a slave card 116, called a subtend host module (SHM), that allows DSLAM 110 to communicate with other DSLAMs within a hierarchical arrangement. Although this particular embodiment may be used to illustrate the operation of system 110, a variety of other communication or processing systems may dynamically allocate bus bandwidth without departing from the scope of the present invention.

Bus 114 is a shared medium used by master card 112 to communicate with slave cards 116. Bus 114 may support serial or parallel communication between master card 112 and slave cards 116. For example, if system 110 is a DSLAM as described above, bus 114 may comprise a serial management bus. Links 132 and 134 couple bus 114 to master card 112 and slave cards 116, respectively. Links 132 and 134 may comprise wireless, wire-line, or any other suitable communication paths and may be associated with one or more intermediate components. In a particular embodiment, bus 114 comprises one or more traces within a backplane, and links 132 and 134 comprise connectors coupling the traces to master card 112 and slave cards 116.

Master card 112 comprises an application 118, a data link layer 119, a processor 121, and a memory 124. Application 118, data link layer 119, and processor 121 represent separate layers of functionality within master card 112. As described in further detail below, application 118 performs various processing or communication operations specific to the functionality of master card 112, and data link layer 119 performs operations related to the transport of data to or from slave cards 116. Application 118, data link layer 119, and processor 121 may be implemented in hardware, software, or both. Typically, application 118, data link layer 119, and processor 121 are reasonably self-contained so that the tasks assigned to each may be designed, constructed, and updated substantially independent of the specific implementation of the other. Although the particular embodiment illustrated in FIG. 1 does not include any intervening layers of protocol between application 118, data link layer 119, and processor 121, the present invention contemplates various alternative embodiments in which one or more intervening layers of protocols may separate application 118, data link layer 119, and processor 121. Additionally, alternative embodiments may not take advantage of the benefits of separate, self-contained layers that interact through limited protocols, and, in such embodiments, the functionality of application 118, data link layer 119, and processor 121 may be combined and implemented in one or more alternative layers of functionality within master card 112.

Application 118 performs various communication or processing operations within master card 112. For example, if system 110 is a DSLAM as described above, application 118 may comprise a connection manager, a configuration manager, a performance manager, or any other suitable management application. A connection manager controls connections between slave cards 116. For example, when LIM 116a receives a transmission from a telephone line, LIM 116a requests a connection with an available ATU-C 116b, and the connection manager instructs LIM 116a to communicate its output data signal to a particular ATU-C 116b. A configuration manager collects configuration data from slave cards 116. For example, a configuration manager may request from slave cards 116 their serial number or code version. A performance manager monitors the performance of slave cards 116. For example, a performance manager may request from slave cards 116 their rate of operation. In other communication or processing systems 110, master card 112 may include any number of alternative communication or processing applications 118. To communicate with slave cards 116, each application 118 relies on data link layer 119.

To transport data between master card 112 and slave cards 116, data link layer 119 uses information stored in memory 124. Memory 124 stores two types of information. First, memory 124 stores a plurality of queues 126a, 126b, and 126c (collectively, queues 126). Each queue 126 is associated with one of slave cards 116 and stores data to be communicated to associated slave card 116. For example, queue 126a may be associated with slave card 116a and store data to be communicated to slave card 116a. In a particular embodiment, queues 126 may comprise first-in, first-out (FIFO) queues that store and retrieve data in the order received. In another embodiment, data may be associated with one or more attributes, and queues 126 may store and retrieve data according to the attributes associated with the data. In such an embodiment, messages with a higher priority may progress through queues 126 more quickly than messages with a lower priority. Although queues 126 store data to be communicated to slave cards 116, queues 126 may store data received from slave cards 116 in alternative embodiments. In addition to queues 126, memory 124 stores a bandwidth table 128 that includes a plurality of bandwidth entries 130a, 130b, and 130c (collectively, bandwidth entries 130). Each bandwidth entry 130 is associated with one of slave cards 116 and stores bandwidth information relating to a bandwidth allocated to associated slave card 116. For example, bandwidth entry 130a may be associated with slave card 116a and store bandwidth information relating to a bandwidth allocated to associated slave card 116a. In a particular embodiment, the bandwidth information may indicate the bandwidths allocated to associated slave cards 116, and in another embodiment, the bandwidth information may indicate the rates at which master card 112 polls slave cards 116 for service.

Data link layer 119 dynamically allocates bus bandwidths to slave cards 116 and communicates with slave cards 116 according to the allocated bandwidths. Data link layer 119 comprises a control module 120 and a communication module 122. Although control module 120 and communication module 122 are implemented within a single functional layer in the particular embodiment illustrated in FIG. 1, control module 120 and communication module 122 may be implemented within separate functional layers in alternative embodiments.

Communication module 122 receives data from application 118 and communicates the data to slave cards 116 according to the bandwidths allocated to slave cards 116. Communication module 122 receives data from application 118 and communicates the data to memory 124. Memory 124 stores the data in queues 126 according to which slave card 116 is the intended recipient of the data. For example, if communication module 122 receives data for delivery to slave card 116a, communication module 122 communicates the data to memory 124, and memory 124 stores the data in queue 126a associated with slave card 116a. Communication module 122 also retrieves data from queues 126 and then communicates the data to slave cards 116 according to the bandwidth information stored in bandwidth entries 130. For example, bandwidth entry 130a may be associated with slave card 116a and store bandwidth information relating to a bandwidth allocated to slave card 116a. In such a scenario, communication module 122 retrieves data from queue 126a, also associated with slave card 116a, and communicates the data to slave card 116a according to the bandwidth information stored in associated bandwidth entry 130a. Similarly, bandwidth entry 130b may be associated with slave card 116b and store bandwidth information relating to a bandwidth allocated to slave card 116b. Likewise, communication module 122 retrieves data from queue 126b associated with slave card 116b and communicates the data to slave card 116b according to the bandwidth information stored in associated bandwidth entry 130b. Thus, if bandwidth entries 130a and 130b indicate that a larger amount of bandwidth is allocated to slave card 116a than slave card 116b, then communication module 122 retrieves data from queue 126a and communicates the data to slave card 116a more frequently than it retrieves data from queue 126b and communicates the data to slave card 116b. As a result, master card 112 accommodates different types of slave cards 116 by communicating data to slave cards 112 according to different bandwidths.

Communication module 122 also polls slave cards 116 for service according to the bandwidths allocated to slave cards 116. In a particular embodiment, cards 116 may not initiate communication over bus 114 but can only respond to communication from master card 112. As a result, master card 112 must periodically poll slave cards 116 for service. In operation, master card 112 communicates poll messages to slave cards 116 according to the bandwidth information stored in associated bandwidth entries 130. When slave cards 116 receive a poll message from master card 112, slave cards 116 generally may acknowledge receipt of the poll message or respond with a request for service. Thus, the rate at which master card 112 polls slave cards 116 relates to the rate at which slave cards 116 may communicate data to master card 112. For example, bandwidth entry 130a may be associated with slave card 116a and store bandwidth information relating to a bandwidth allocated to slave card 116a, and bandwidth entry 130b may be associated with slave card 116b and store bandwidth information relating to a bandwidth allocated to slave card 116b. In such a scenario, communication module 122 communicates poll messages to slave card 116a according to the bandwidth information stored in associated bandwidth entry 130a, and communication module 122 communicates poll messages to slave card 116b according to the bandwidth information stored in associated bandwidth entry 130b. Thus, if bandwidth entries 130a and 130b indicate that a larger amount of bandwidth is allocated to slave card 116a than slave card 116b, then communication module 122 communicates poll messages to slave card 116a more frequently than it communicates poll messages to slave card 116b. As a result, slave card 116a communicates data to master card 112 more frequently than slave card 116b communicates data to master card 112. Master card 112 accommodates different types of slave cards 116 by allowing slave cards 112 to communicate data to master card 112 according to different bandwidths.

Control module 120 controls the bus bandwidths allocated to slave cards 116. Control module 120 allocates a bandwidth to each slave card 116 and then generates bandwidth information relating to the bandwidth allocated to each slave card 116. Control module 120 communicates the bandwidth information to memory 124 using link 123, and memory 124 stores the bandwidth information in bandwidth entries 130. In a particular embodiment, control module 120 may allocate a default bandwidth to slave cards 116 at start-up and then dynamically allocate new bandwidths to slave cards 116 during the operation of system 110.

Master card 112 may initiate several methods of dynamically allocating new bandwidths to slave cards 116. According to a first method, control module 120 allocates a new bandwidth to slave cards 116 in response to receiving a bandwidth message from application 118. Application 118 generates a bandwidth message requesting master card 112 to change the bandwidth allocated to one or more slave cards 116. For example, application 118 may involve a bandwidth-intensive operation, such as a software download to slave card 116a, and application 118 may generate a bandwidth message requesting master card 112 to allocate more bandwidth to slave card 116a. In a particular embodiment, the bandwidth message may comprise a request for an absolute amount of bandwidth, and in another embodiment, the bandwidth message may comprise a request for a relative increase or decrease in the bandwidth allocated to slave cards 116. In response to receiving the bandwidth message from application 118, control module 120 allocates a new bandwidth to one or more slave cards 116, as indicated by the bandwidth message. In a particular embodiment, control module 120 may allocate a new bandwidth to slave card 116 by increasing or decreasing the bandwidth already allocated to slave card 116 by a fixed amount. After allocating a new bandwidth to slave card 116, control module 120 modifies the bandwidth information associated with slave card 116 to indicate the new bandwidth.

According to a second method of dynamically allocating bus bandwidths to slave cards 116, control module 120 determines the sizes of queues 126 and allocates new bandwidths to associated slave cards 116 according to the sizes of queues 126. The sizes of queues 126 indicate the amount of data stored in queues 126, the numbers of messages stored in queues 126, or some other indication of information stored for delivery to slave cards 116. In a particular embodiment, control module 120 may allocate new bandwidths to slave cards 116 according to a change in the sizes of associated queues 126. For example, control module 120 may allocate more bandwidth to slave card 116a according to an increase in the size of associated queue 126a. Alternatively, control module 120 may allocate less bandwidth to slave card 116a according to a decrease in the size of associated queue 126a. In a particular embodiment, control module 120 may allocate a new bandwidth to slave card 116 by increasing or decreasing the bandwidth already allocated to slave card 116 by a fixed amount. After allocating a new bandwidth to slave card 116, control module 120 modifies the bandwidth information associated with slave card 116 to indicate the new bandwidth. Although queues 126 store data for delivery to slave cards 116, the described method could also be applied to queues that store data received from slave cards 116.

According to a third method of dynamically allocating bus bandwidths to slave cards 116, control module 120 automatically decreases the bandwidths allocated to slave cards 116 after a period of time. Typically, system 110 implements this "policing" mechanism to prevent one slave card 116 from monopolizing the bus bandwidth for an extended period of time and thereby substantially degrading the performance of other slave cards 116. To allow slave card 116 to utilize a substantial amount of bandwidth without monopolizing bus 114, control module 120 allocates a substantial amount of bandwidth to slave card 116 but retains the ability to automatically decrease the bandwidth allocated to slave card 116 after a period of time. When the period of time expires, control module 120 automatically decreases the bandwidth allocated to slave card 116. As in the above two methods, control module 120 modifies the bandwidth information associated with slave card 116 to indicate the new bandwidth allocated to slave card 116. By policing the use of substantial amounts of bandwidth, master card 112 prevents slave card 116 from crowding bus 114 and interfering with the performance of other slave cards 116.

As a result of modifying the bandwidth information associated with slave card 116 according to one of the methods described above, communication module 122 may communicate data to slave card 116 according to the new bandwidth indicated by the modified bandwidth information stored in associated bandwidth entry 130. Also, communication module 122 may communicate poll messages to slave card 116, and thus receive data from slave card 116, according to the new bandwidth indicated by the modified bandwidth information stored in associated bandwidth entry 130. By dynamically allocating bus bandwidths to slave cards 116, master card 112 accommodates the changing needs of slave cards 116 and improves the overall performance of system 110.

In addition to these methods initiated by master card 112, the present invention contemplates other methods of dynamically allocating bandwidth that are initiated by slave card 116.

Figure 2:
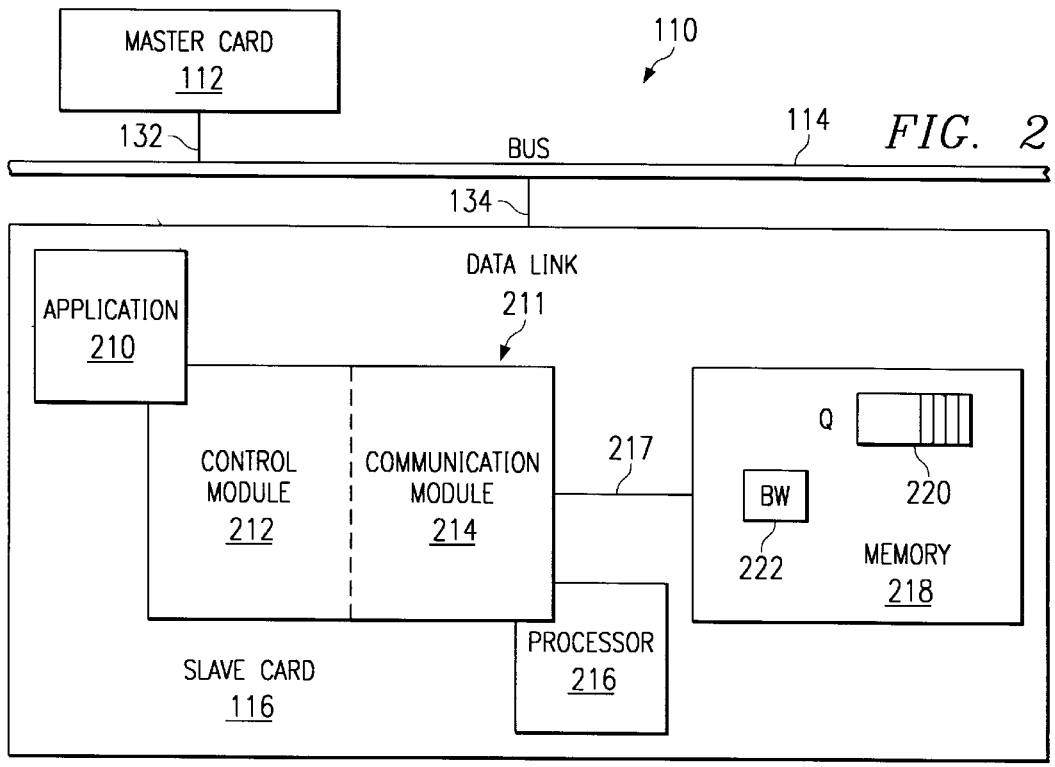
FIG. 2 illustrates a slave card within a system that dynamically allocates bus bandwidth.

FIG. 2 illustrates in greater detail slave card 116 within system 110. Slave card 116 comprises an application 210, a data link layer 211, a processor 216, and a memory 218. Application 210, data link layer 211, and processor 216 represent separate layers of functionality within system 110. As described in further detail below, application 210 performs processing and communication operations specific to the functionality of slave card 116, and data fink layer 211 performs operations related to the transport of data to or from master card 112. Application 210, data link layer 211, and processor 216 may be implemented in hardware, software, or both. Typically, application 210, data link layer 211, and processor 216 are reasonably self-contained so that the tasks assigned to each may be designed, constructed, and updated substantially independent of the specific implementation of the others. Although the particular embodiment illustrated in FIG. 2 does not include any intervening layers of protocol between application 210, data link layer 211, and processor 216, the present invention contemplates various alternative embodiments in which one or more intervening layers of protocol may separate application 210, data link layer 211, and processor 216. Additionally, application 210, data link layer 211, and processor 216 may be combined within one or more layers of functionality and not take advantage of the benefits of separate, self-contained layers that interact through limited protocols.

Application 210 performs various communication or processing operations within slave card 116. For example, if system 110 is a DSLAM as described above, slave card 116 may be a LIM and include one or more applications 210 that receive a transmission from a twisted pair telephone line, split the transmission into a telephone signal and a data signal, communicate the telephone signal to a public switched telephone network, and communicate the data signal to an ATU-C. Alternatively, slave card 116 may be an ATU-C and include one or more applications 210 that receive a data signal from a LIM and communicate data corresponding to the signal to a NIC. In addition, slave card 116 may be a NIC and include one or more applications 210 for communicating data received from an ATU-C to a data network, such as the Internet. Slave card 116 may also be a SHM and include one or more applications 210 that allow system 110 to communicate with other DSLAMS within a hierarchical arrangement. In other communication or processing systems 110, slave cards 116 may comprise any number of alternative communication or processing applications 210. To communicate with master card 112, each application 210 relies on data link layer 211.

Data link layer 211 uses information stored in memory 218 to communicate with master card 112. Memory 218 stores a queue 220 that comprises data to be communicated to master card 112. In a particular embodiment, queue 220 is a first-in, first-out (FIFO) queue that stores and retrieves data in the order received. In another embodiment, data may be associated with one or more attributes, and queue 220 may store and retrieve data according to the attributes associated with the data. In such an embodiment, messages with a higher priority may progress through queue 220 more quickly than messages with a lower priority. Although queue 220 stores data to be communicated to master card 112, queue 220 may store data received from master card 112 in alternative embodiments. In addition to queue 220, memory 218 stores bandwidth information in a bandwidth entry 222. The bandwidth information relates to a bandwidth allocated to slave card 116 by master card 112. In a particular embodiment, the bandwidth information indicates the bandwidth allocated to slave card 116, and, in another embodiment, the bandwidth information indicates a rate at which master card 112 polls slave card 116 for service.

Data link layer 211 performs operations related to the transport of data to or from master card 112. Data link layer 211 is comprised of a control module 212 and a communication module 214. Although control module 212 and communication module 214 are implemented within a single functional layer in the particular embodiment illustrated in FIG. 2, control module 212 and communication module 122 may be implemented within separate functional layers in alternative embodiments.

Communication module 214 receives data from application 210 and communicates the data to master card 112 according to a bandwidth allocated to slave card 116. After receiving data from application 210, communication module 214 communicates the data to memory 218. Memory 218 stores the data in queue 220. In response to receiving a poll message from master card 112, communication module 214 retrieves data from queue 220 and communicates the data to master card 112. Because slave card 116 receives poll messages according to a bandwidth allocated by master card 112, communication module 214 also retrieves data from queue 220 and communicates the data to master card 112 according to the allocated bandwidth.

As mentioned above, slave card 116 may initiate several methods of dynamically allocating bandwidth. In each of these methods, control module 212 communicates a bandwidth message to master card 112 requesting master card 112 to change the bandwidth allocated to slave card 116. In a particular embodiment, the bandwidth message comprises a request for an absolute amount of bandwidth, and in another embodiment, the bandwidth message comprises a request for a relative increase or decrease in the bandwidth allocated to slave card 116. In a particular embodiment, control module 212 retrieves bandwidth information from bandwidth entry 222 stored in memory 218, and, based on the bandwidth information, control module 212 determines an amount of bandwidth to request from master card 112.

According to a first method of communicating a bandwidth message to master card 112, control module 212 communicates the bandwidth message in response to receiving an application message from application 210. Application 210 may communicate an application message to control module 212. The application message relates to the bandwidth allocated to slave card 116. In one embodiment, the application message comprises a request for an absolute amount of bandwidth, and in another embodiment, the application message comprises a request for a relative increase or decrease in the bandwidth already allocated to slave card 116. In response to receiving the application message, control module 212 communicates a bandwidth message to master card 112 requesting master card 112 to change the bandwidth allocated to slave card 116.

According to a second method of communicating a bandwidth message to master card 112, control module 212 determines a size of queue 220 within memory 218 and communicates the bandwidth message according to the size of queue 220. The size of queue 220 relates to the amount of data stored in queue 220, the number of messages in queue 220, or any other indication of information stored for delivery to master card 112. Using information relating to queue 220 in memory 218, control module 212 determines the size of queue 220. Control module 212 then may communicate a bandwidth message according to the size of queue 220. In a particular embodiment, control module 212 communicates a bandwidth message requesting master card 112 to allocate more bandwidth to slave card 116 according to an increase in the size of queue 220, and control module 212 may communicate a bandwidth message requesting master card 112 to allocate less bandwidth to slave card 116 according to a decrease in the size of queue 220. Although queue 220 stores data for delivery to master card 112, the described method could also be applied to a queue that stores data received from master card 112.

According to a third method of communicating a bandwidth message to master card 112, control module 212 examines the processing being performed by processor 216 and generates the bandwidth message according to the processing being performed by processor 216. In a particular embodiment, control module 212 communicates the bandwidth message according to the amount of processing being performed by processor 216. Using information relating to processor 216, control module 212 determines an amount of processing being performed by processor 216 and communicates a bandwidth message to master card 112 according to the amount of processing. In a particular embodiment, control module 212 communicates a bandwidth message requesting master card 112 to allocate more bandwidth to slave card 116 according to a decrease in the amount of processing being performed by processor 216. In another embodiment, control module 212 communicates a bandwidth message requesting master card 112 to allocate less bandwidth to associated slave card 116 according to an increase in the amount of processing being performed by processor 216.

In response to receiving a bandwidth message from slave card 116, master card 112 allocates a new bandwidth to slave card 116. As explained above in conjunction with FIG. 1, control module 120 modifies the bandwidth information associated with slave card 116 to indicate the new bandwidth. As a result, communication module 122 may communicate data to or from slave card 116 according to the new bandwidth indicated by the modified bandwidth information.

In a particular embodiment, control module 120 generates a response message indicating the new bandwidth and communicates the response message to slave card 116 using bus 114. Communication module 214 receives the response message from bus 114 using link 134 and communicates the response message to control module 212. Using the response message, control module 212 modifies the bandwidth information stored in bandwidth entry 222 to indicate the new bandwidth. In such an embodiment, when control module 212 communicates a new bandwidth message to master card 112, control module 212 may retrieve the modified bandwidth information from bandwidth entry 222 and, based on the bandwidth information, determine an amount of bandwidth to request from master card 112.

To allocate additional bandwidth to slave card 116 pursuant to any of the above methods, master card 112 may have to decrease the bandwidth allocated to one or more other slave cards 116. Because bus 114 has a limited amount of bandwidth, all of the available bus bandwidth may be allocated to slave cards 116. In such a scenario, control module 120 cannot allocate additional bandwidth to slave card 116 without allocating less bandwidth to one or more other slave cards 116. First, control module 120 determines whether a threshold amount of bandwidth has been allocated to the plurality of slave cards 116. In a particular embodiment, the threshold amount of bandwidth is an amount less than the maximum bandwidth of the bus. In such an embodiment, control module 120 may deallocate bus bandwidth from slave cards 116 prior to actually needing additional available bandwidth. After determining that a threshold amount of bandwidth has been allocated to slave cards 116, control module 116 deallocates bus bandwidth from one or more slave cards 116. For example, in a particular embodiment, control module 120 may identify slave card 116 that is allocated the most amount of bus bandwidth and automatically decrease its allocated bandwidth. In another embodiment, master card 112 may proportionally allocate less bandwidth to a plurality of slave cards 112 to create additional available bandwidth.

System 110 contemplates any configuration of master card 112, bus 114, and slave cards 116 that performs one or more of these methods of dynamically allocating bus bandwidth. Thus, system 110 may perform any one or combination of the described methods. In addition, the elements of system 110 may be combined in many alternative configurations that may comprise additional, alternative, or omitted elements.

Figures 3, 4:
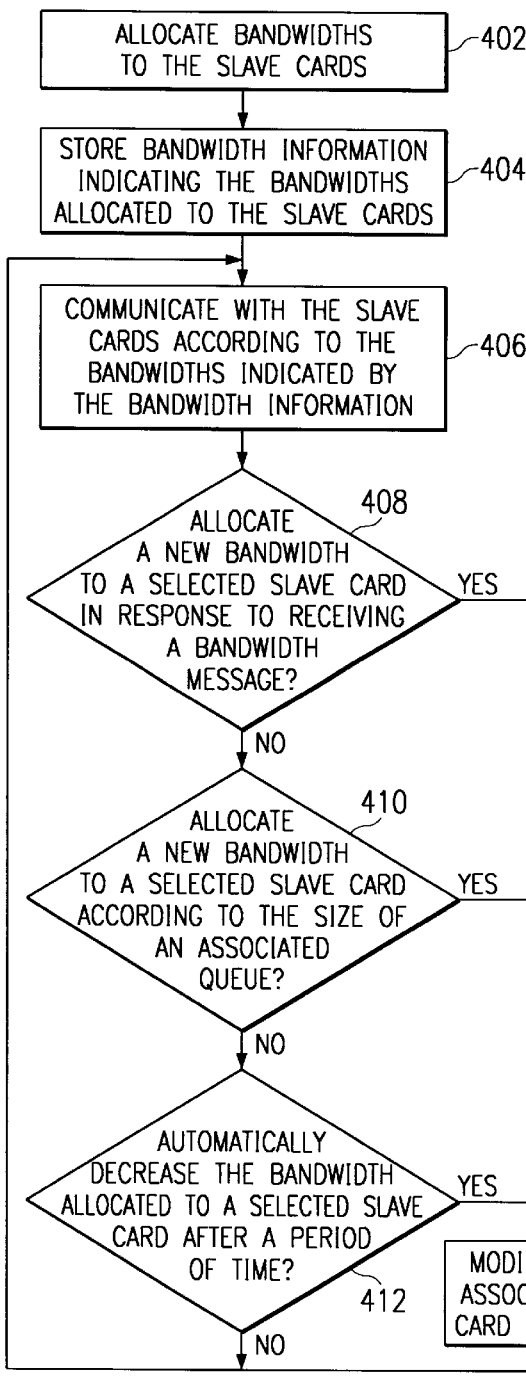
FIG. 3 is a table demonstrating the operation of a system that dynamically allocates bus bandwidth.
FIG. 4 is a flow chart illustrating a method of dynamically allocating bus bandwidth as initiated by a master card.

FIG. 3 is a table demonstrating the operation of system 110. The table indicates the bandwidths allocated to slave cards 116a, 116b, and 116c, along with the contents of their associated queues 126a, 126b, and 126c. Within the table, the bus bandwidth values indicate the bandwidths allocated to slave cards 116, the rates at which master card 112 polls slave cards 116, or any other suitable information that relates to the allocated bandwidths. The queue values within the table represent the relative number of messages to be communicated to slave cards 116, although, in an alternative embodiment, the value may indicate the relative amount of data to be communicated to associated slave cards 116. For purpose of clarity, the particular values used in FIG. 3 were chosen for their relative relationships and, thus, do not have any absolute significance apart from the table.

Time 0 represents the state of system 110 at start-up. As indicated, master card 112 has allocated a default bandwidth of 10 to each slave card 116, and queues 126 include no messages for delivery to slave cards 116. In operation, application 118 generates data to be communicated to slave cards 116. Thus, at time 1, each queue 126 includes 4 messages for delivery to slave cards 116. At time 1, application 118 communicates a bandwidth message to control module 120 requesting control module 120 to allocate additional bandwidth to slave card 116a. In response to receiving the application message, control module 120 allocates additional bandwidth to slave card 116a and modifies the bandwidth information associated with slave card 116a to indicate the additional bandwidth. Thus, at time 2, slave card 116a has a bus bandwidth of 15, and slave cards 116b and 116c still have a bus bandwidth of 10.

At time 3, queue 126b associated with slave card 116b has increased to 7 messages. Control module 120 determines the size of each queue 126. In response to the increase in the size of queue 126b, control module 120 allocates additional bandwidth to slave card 116b and modifies the bandwidth information associated with slave card 116b to indicate the additional bandwidth. Thus, at time 4, slave card 116b has an increased bus bandwidth of 15. Because of this additional bandwidth, communication module 122 sends messages to slave card 116b more frequently. As a result, at time 5, queue 126b associated with slave card 116b has decreased to 4 messages. Control module 120 again determines the size of each queue 126. In response to the decrease in the size of queue 126b, control module 120 allocates less bandwidth to slave card 116b and modifies the bandwidth information associated with slave card 116b to indicate the new bandwidth. Thus, at time 6, the bus bandwidth of slave card 116b has returned to 10.

At time 6, application 118 communicates a bandwidth message to control module 120 requesting control module 120 to allocate a substantial amount of bandwidth to slave card 116c. In response to receiving the application message, control module 120 allocates a substantial amount of bandwidth to slave card 116c. Because bus 114 has a maximum total bandwidth of 40, control module 120 determines that a threshold amount of bus bandwidth has been allocated to slave cards 116 and, thus, decreases the bandwidth allocated to slave cards 116a and 116b to 5 before allocating a bandwidth of 30 to slave card 116c. Control module 120 modifies the bandwidth information associated with slave cards 116 to indicate the new bandwidths. Thus, at time 7, slave cards 116a and 116b have a bus bandwidth of 5, and slave card 116c has a bus bandwidth of 30. To prevent slave card 116c from monopolizing bus 114, control module 120 automatically decreases the bandwidth allocated to slave card 116c after a period of time. Thus, at time 8, slave cards 116a and 116b have a bus bandwidth of 10, and slave card 116c has a bus bandwidth of 20.

At time 8, slave card 116b communicates a bandwidth message to master card 112 requesting master card 112 to allocate more bandwidth to slave card 116b. Slave card 116b may communicate the bandwidth message to master card 112 in response to receiving an application message from application 210. Alternatively, slave card 116b may determine the size of queue 220 and communicate the bandwidth message according to the size of queue 220, or slave card 116b may examine the processing being performed by processor 216 and communicate the bandwidth message according to the processing being performed by processor 216. In response to receiving the bandwidth message from slave card 116b, master card 112 allocates additional bandwidth to slave card 116b. Because bus 114 has a maximum total bandwidth of 40, control module 120 determines that a threshold amount of bus bandwidth has been allocated to slave cards 116 and, thus, decreases the bandwidth allocated to slave card 116c to 15 before allocating a bandwidth of 15 to slave card 116b. Control module 120 modifies the bandwidth information associated with slave cards 116b and 116c to indicate the new bandwidths. Thus, slave cards 116b and 116c have a bus bandwidth of 15 at time 9. The table of FIG. 3 illustrates the changing states of system 110 due to a particular sequence of operations. System 110 may perform a number of different operations in a number of different sequences, and, thus, the table of FIG. 3 is merely illustrative for purpose of demonstration.

FIG. 4 is a flow chart demonstrating a method of dynamically allocating a bus bandwidth as initiated by master card 112. The method begins at step 402, where master card 112 allocates bandwidths to slave cards 116. Master card 112 stores bandwidth information indicating the bandwidths allocated to slave cards 116 at step 404. Master card 112 communicates with slave cards 116 according to the bandwidths indicated by the bandwidth information at step 406. In response to receiving a bandwidth message from application 118 of slave card 116, master card 112 may allocate a new bandwidth to slave card 116 at step 408. If master card 112 allocates a new bandwidth to slave card 116, then the method continues at step 414. If master card 112 does not allocate a new bandwidth to slave card 116, then the method continues at step 410. Master card 112 stores a plurality of queues 126 comprising data to be sent to associated slave cards 116, and at step 410, master card 112 may allocate a new bandwidth to slave card 116 according to the size of associated queue 126. If master card 112 allocates a new bandwidth to slave card 116, then the method continues at step 414. If master card 112 does not allocate a new bandwidth to slave card 116, then the method continues at step 412. Master card 112 may automatically decrease the bandwidth allocated to slave card 116 after a period of time at step 412. If master card 112 decreases the bandwidth allocated to slave card 116, then the method continues at step 414. If master card does not decrease the bandwidth allocated to slave card 116, then the method returns to step 406, where master card 112 communicates with slave cards 116 according to the bandwidths indicated by the stored bandwidth information. At step 414, master card 112 modifies the bandwidth information associated with slave card 116 to indicate a new bandwidth allocated by master card 112. The method returns to step 406, where master card 112 communicates with slave cards 116 according to the bandwidths indicated by the modified bandwidth information. Thus, master card 112 dynamically allocates bus bandwidths to slave cards 116 and communicates with slave cards 116 according to the dynamically allocated bandwidths.

Figure 5:
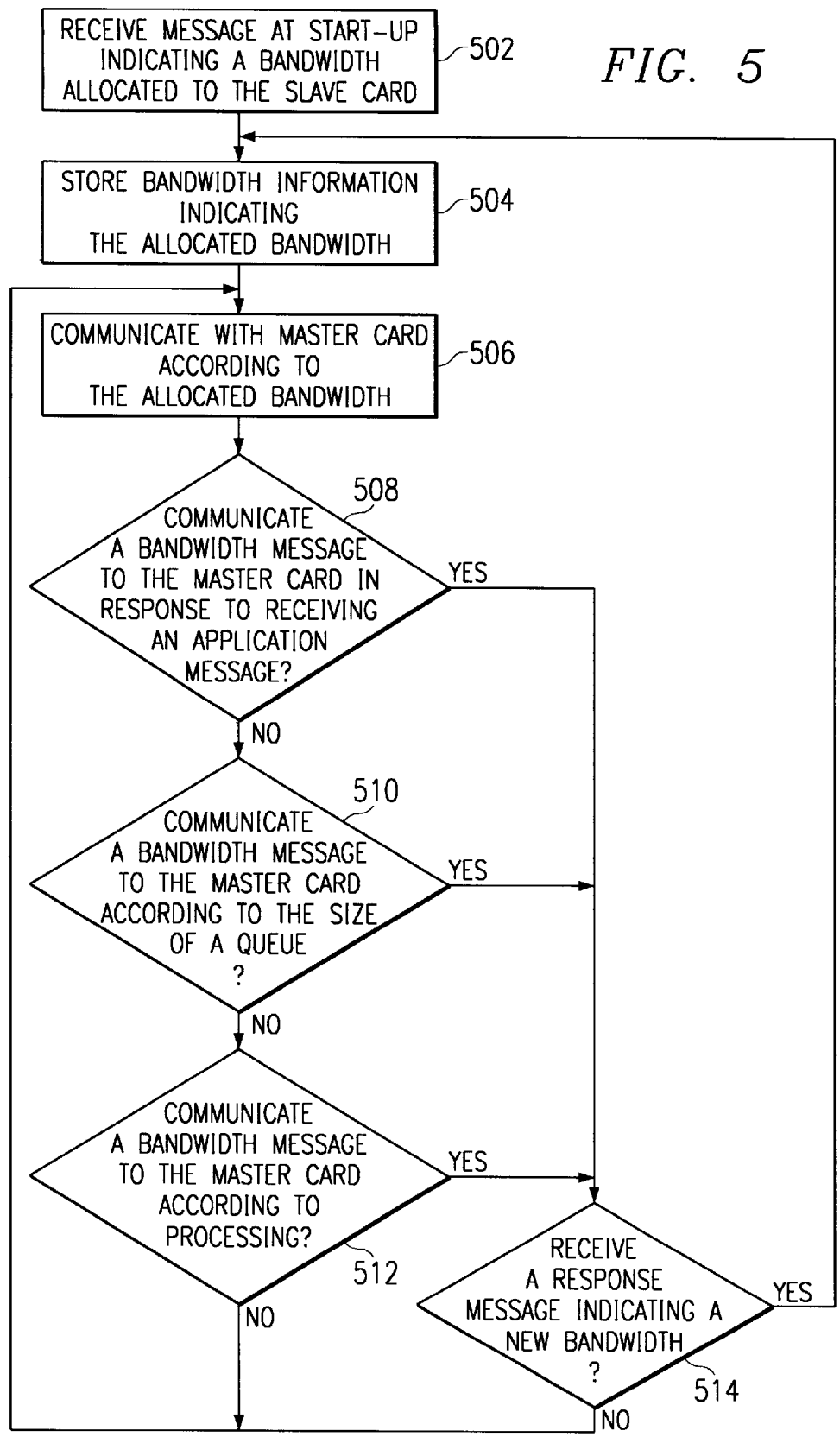
FIG. 5 is a flow chart illustrating a method of dynamically allocating bus bandwidth as initiated by a slave card.

FIG. 5 is a flowchart demonstrating a method of dynamically allocating bus bandwidth as initiated by slave card 116. The method begins at step 502, where slave card 116 receives a message at start-up indicating a bandwidth allocated to slave card 116. Slave card 116 stores bandwidth information indicating the allocated bandwidth at step 504 and communicates with master card 112 according to the allocated bandwidth at step 506. In response to receiving an application message relating to the bandwidth allocated to slave card 116, slave card 116 may communicate a bandwidth message to master card 112 at step 508. If slave card 116 communicates the bandwidth message to master card 112, then the method continues at step 514. If slave card 116 does not communicate the bandwidth message to master card 112, then the method continues at step 510. Slave card 116 stores queue 220 comprising data to be sent to master card 112 and may communicate a bandwidth message to master card 112 according to the size of queue 220 at step 510. If slave card 116 communicates the bandwidth message to master card 112, then the method continues at step 514. If slave card 116 does not communicate the bandwidth message then the method continues at step 512. Slave card 116 may communicate a bandwidth message to master card 112 according to the processing being performed by processor 216 at step 512. If slave card 116 communicates the bandwidth message to master card 112, then the method continues at step 514. If slave card 116 does not communicate the bandwidth message, then the method returns to step 506, where slave card 116 communicates with master card 112 according to the allocated bandwidth. At step 514, slave card 116 may receive a response message indicating a new bandwidth. If slave card 116 receives the response message indicating a new bandwidth, then the method returns to step 504, where slave card 116 stores bandwidth information indicating the new bandwidth. If slave card 116 does not receive the response message indicating a new bandwidth, then the method returns to step 506, where slave card 116 communicates with master card 112 according to the allocated bandwidth. Using this method, slave card 116 communicates with master card 112 according to a dynamically allocated bandwidth.

Although an embodiment of the invention and its advantages are described in detail, a person skilled in the art could make various alterations, additions, and omissions without departing from the spirit and scope of the present invention as defined by the appended claims.

What is claimed is:

1. A bus management system for dynamically allocating bandwidth, comprising:
    a bus;
    a plurality of slave cards coupled to the bus and operable to communicate data to the bus and receive data from the bus; and
    a master card coupled to the bus and operable to communicate data to the bus and receive data from the bus, the master card comprising:
        a memory operable to store bandwidth information indicating bandwidths allocated to the slave cards;
        a communication module coupled to the bus and the memory, the communication module operable to communicate with the slave cards according to the bandwidths indicated by the bandwidth information; and
        a control module coupled to the memory and operable to allocate a new bandwidth to a selected slave card and to modify the bandwidth information to indicate the new bandwidth allocated to the selected slave card.

2. The bus management system of claim 1, wherein the control module is further operable to receive a bandwidth message from an application and to allocate the new bandwidth to the selected slave card in response to receiving the bandwidth message.

3. The bus management system of claim 1, wherein the control module is further operable to receive a bandwidth message from the selected slave card and to allocate the new bandwidth to the selected slave card in response to receiving the bandwidth message.

4. The bus management system of claim 1, wherein:
    the memory is further operable to store a plurality of queues, each queue comprising data to be sent to an associated slave card; and
    the control module is further operable to determine a size of a queue associated with the selected slave card and to allocate the new bandwidth to the selected slave card according to the size of the associated queue.

5. The bus management system of claim 1, wherein the control module is further operable to decrease the new bandwidth allocated to the selected slave card automatically after a period of time.

6. The bus management system of claim 1, wherein the control module allocates less bandwidth to one or more slave cards in response to determining that a threshold amount of bandwidth has been allocated to the plurality of slave cards.

7. The bus management system of claim 1, wherein the control module allocates the new bandwidth to the selected slave card by changing a bandwidth allocated to the selected slave card by a fixed increment.

8. The bus management system of claim 1, wherein the bandwidth information indicates polling rates at which the communication module is operable to poll the slave cards for service.

9. The bus management system of claim 1, wherein the bus is a serial management bus of a telecommunications device.

10. A slave card for communicating with a master card over a bus according to a dynamically allocated bandwidth, the slave card comprising:
    a communication module coupled to the bus and operable to communicate data to the bus and receive data from the bus according to a first bandwidth allocated to the slave card by the master card; and
    a control module coupled to the communication module and operable to communicate a bandwidth message requesting the master card to change the first bandwidth allocated to the slave card, wherein the communication module is further operable to communicate data to the bus and receive data from the bus according to a second bandwidth allocated to the slave card by the master card.

11. The slave card of claim 10, further comprising an application coupled to the control module and operable to communicate an application message to the slave card, wherein the control module is operable to communicate the bandwidth message to the master card in response to receiving the application message from the application.

12. The slave card of claim 10, further comprising a memory coupled to the control module and having a queue comprising data to be sent to the master card, wherein the control module is further operable to determine a size of the queue and to communicate the bandwidth message to the master card according to the size of the queue.

13. The slave card of claim 10, further comprising a processor coupled to the control module, wherein the control module is further operable to examine processing being performed by the processor and to communicate the bandwidth message to the master card according to the processing being performed by the processor.

14. The slave card of claim 10, further comprising a memory coupled to the control module and operable to store bandwidth information indicating the first bandwidth allocated to the slave card by the master card, wherein the control module is further operable to determine an amount of bandwidth to request from the master card according to the stored bandwidth information, to receive a response message indicating the second bandwidth, and to modify the bandwidth information to indicate the second bandwidth.

15. The slave card of claim 10, wherein the bus is a serial management bus of a telecommunications device.

16. A method for dynamically allocating bandwidth to a plurality of slave cards coupled to a bus, the method comprising:

storing in a memory bandwidth information indicating bandwidths allocated to a plurality of slave cards;

communicating with the slave cards using a bus according to the bandwidths indicated by the bandwidth information;

allocating a new bandwidth to a selected slave card;

modifying the bandwidth information to indicate the new bandwidth allocated to the selected slave card; and communicating with the selected slave card according to the new bandwidth indicated by the bandwidth information.

17. The method of claim 16, further comprising:

receiving a bandwidth message from an application; and allocating the new bandwidth to the selected slave card in response to receiving the bandwidth message.

18. The method of claim 16, further comprising:

receiving a bandwidth message from the selected slave card; and allocating the new bandwidth to the selected slave card in response to receiving the bandwidth message.

19. The method of claim 16, further comprising:

storing in a queue data to be sent to the selected slave card;

determining a size of the queue; and allocating the new bandwidth to the selected slave card according to the size of the queue.

20. The method of claim 16, further comprising decreasing the new bandwidth allocated to the selected slave card automatically after a period of time.

21. The method of claim 16, further comprising:

determining whether a threshold amount of bandwidth has been allocated to the plurality of slave cards; and allocating less bandwidth to one or more slave cards in response to determining that a threshold amount of bandwidth has been allocated to the plurality of slave cards.

22. The method of claim 16, wherein allocating a new bandwidth to the selected slave card comprises changing a bandwidth allocated to the selected slave card by a fixed amount.

23. The method of claim 16, wherein communicating with a slave card comprises polling the slave card for service at a rate indicated by the bandwidth information associated with the slave card.

24. The method of claim 16, wherein the bus is a serial management bus of a telecommunications device.

25. A method for communicating with a master card over a bus according to a bandwidth dynamically allocated to a slave card, the method comprising:

communicating data to the master card according to a first bandwidth allocated to the slave card;

communicating to the master card a bandwidth message requesting the master card to change the first bandwidth allocated to the slave card; and communicating data to the master card according to a second bandwidth allocated to the slave card.

26. The method of claim 25, further comprising:

receiving from an application a message relating to the first bandwidth allocated to the slave card; and communicating the bandwidth message to the master card in response to receiving the message from the application.

27. The method of claim 25, further comprising:

storing in a queue data to be sent to the master card;

determining a size of the queue; and communicating the bandwidth message to the master card according to the size of the queue.

28. The method of claim 25, further comprising:

examining processing being performed by a processor; and communicating the bandwidth message to the master card according to the processing.

29. The method of claim 25, further comprising:

storing bandwidth information indicating the first bandwidth allocated to the slave card by the master card;

determining an amount of bandwidth to request from the master card according to the stored bandwidth information;

receiving a response message indicating the second bandwidth allocated to the slave card by the master card; and modifying the bandwidth information to indicate the second bandwidth.

30. The method of claim 25, wherein the bus is a serial management bus of a telecommunications device.

* * * * *